UNITED STATES PATENT OFFICE.

R. A. GILMAN, OF WOODLAND, WISCONSIN.

IMPROVED COMPOUND OIL FOR BURNING AND LUBRICATING.

Specification forming part of Letters Patent No. 40,924, dated December 15, 1863; antedated November 21, 1863.

*To all whom it may concern:*

Be it known that I, R. A. GILMAN, of Woodland, in the county of Dodge and State of Wisconsin, have invented a new and Improved Lubricating and Burning Composition; and I do hereby declare that the following is a full, clear, and exact description of the same.

This invention consists in heating animal fats—such as tallow, lard, &c.—together with mineral hydrocarbon oils—such as petroleum, coal-oil, &c.—in such a manner and to such a temperature that said animal fats unite and combine with the mineral oils, and the mixture becomes liquefied and suitable for lubricating, burning, and other purposes.

To enable those skilled in the art to make and use my invention, I will proceed to describe it.

My invention is based on the discovery that by heating mineral hydrocarbon oils—such as petroleum, coal-oils, &c.—with lard, tallow, and other animal fats the two combine and form a good burning or lubricating mixture.

The proportion in which I mix the ingredients together depends upon the nature and quality of the ingredients, and upon the season of the year in which it is to be used.

The proportion in which I mix the ingredients together is about as follows: lard or tallow, one part; petroleum or coal-oil, two to four parts. These ingredients are heated in a hot-water bath to a temperature of about 195° Fahrenheit, and this temperature is kept up for a term of thirty minutes or more. After the lapse of this time the oils and fats combine intimately, and the composition is fit for lubricating or burning purposes. If the lard, tallow, or other fat used in the operation is old and rancid, I use a small quantity of flour of lime and sulphate of zinc, which may be prepared by dissolving one-half pound of newly-burned lime in one gallon of hot water. In this solution, which ought to be about 3° Twaddle, I dissolve from four to six ounces of white sulphate of zinc per quart of the solution. After the lime and zinc have thus been intimately mixed I use from one-sixteenth to one-fourth of this mixture, by measure, to the fats or oils alone, and continue them by heat sufficient to evaporate the water from the lime and zinc, stirring the mass until it is intimately united. When this is accomplished the hydrocarbon oils are added, and the temperature is maintained at about 195° for thirty minutes or more. If to be used for summer lubricating, the mass should be stirred occasionally while cooling.

By the use of the lime any rancidity that may exist in the fats is counteracted, and at the same time the zinc base is rendered capable to unite or combine more perfectly with the mineral oils, and cause the latter to combine more completely with the fats under the influence of heat.

For burning mixtures the lime and zinc have to be dispensed with.

In some cases, particularly for lubricating purposes, palm-oil may be substituted for tallow or lard, and the proportion between this oil, the mineral oils, the lime, and the zinc is the same, or about the same, as above stated.

Having thus fully described my invention, what I claim as new, and desire to secure by Letters Patent, is—

Combining animal fats—such as tallow, lard, &c.—with mineral hydrocarbon oils—such as petroleum, coal-oil, &c.—by mixing them together, in about the proportion herein specified, and heating them to a temperature of 195°, more or less, with or without the addition of lime and sulphate of zinc, for the purpose described.

R. A. GILMAN.

Witnesses:
C. E. KEYSER,
BEN. M. GILMAN.